US005885502A

United States Patent [19]

DeAngelis et al.

[11] Patent Number: 5,885,502

[45] Date of Patent: Mar. 23, 1999

[54] METHOD OF FORMING PATTERNED WALLS

[75] Inventors: David DeAngelis, Tulsa, Okla.; Gary Batt, Oceanside; Francis W. Sullivan, Newport Beach, both of Calif.

[73] Assignee: Bomanite Corporation, Madera, Calif.

[21] Appl. No.: 884,028

[22] Filed: Jun. 27, 1997

(Under 37 CFR 1.47)

Related U.S. Application Data

[63] Continuation of Ser. No. 580,034, Dec. 20, 1995, abandoned.

[51] Int. Cl.[6] .............................. B29C 33/40; E04B 1/16

[52] U.S. Cl. ............................ 264/219; 264/31; 264/220; 264/333; 249/15; 249/16; 249/33; 249/112

[58] Field of Search .................................... 264/219, 220, 264/333, 33, 34, 31; 249/16, 15, 112, 33

[56] References Cited

U.S. PATENT DOCUMENTS

| | | | |
|---|---|---|---|
| Re. 29,945 | 3/1979 | Scott | 249/80 |
| D. 257,178 | 9/1980 | Nasvik | D25/58 |
| D. 282,623 | 2/1986 | Nasvik | D8/45 |
| 787,665 | 4/1905 | Deeds et al. . | |
| 1,479,647 | 1/1924 | Carroll . | |
| 1,491,205 | 4/1924 | Ford . | |
| 1,636,396 | 7/1927 | Urschel . | |
| 1,712,678 | 5/1929 | Redman . | |
| 1,776,999 | 9/1930 | Jensen . | |
| 1,937,306 | 11/1933 | Barriball | 25/118 |
| 2,323,299 | 7/1943 | Craig | 20/5 |
| 2,474,654 | 6/1949 | Carlson | 25/155 |
| 2,513,648 | 7/1950 | Iezzi | 18/59 |
| 2,517,432 | 8/1950 | Hornberger | 25/1 |
| 2,616,145 | 11/1952 | Dufford | 25/118 |

(List continued on next page.)

FOREIGN PATENT DOCUMENTS

| | | |
|---|---|---|
| 450070 | 7/1948 | Canada . |
| 987582 | 9/1976 | Canada . |
| 1.101.365 | 10/1955 | France . |
| 2214802 | 8/1974 | France . |
| 2489737 | 3/1982 | France . |
| 2496141 | 6/1982 | France . |
| 2596686 | 10/1987 | France . |
| 2608496 | 6/1988 | France . |
| 2408425 | 9/1975 | Germany . |
| 2449398 | 4/1976 | Germany . |
| 2557632 | 6/1977 | Germany . |
| 3135979 | 3/1983 | Germany . |
| 53-23331 | 7/1978 | Japan . |
| 59-158825 | 9/1984 | Japan . |
| 1-214662 | 9/1989 | Japan . |
| 1-249302 | 10/1989 | Japan . |
| 1-259943 | 10/1989 | Japan . |
| 718778 | 11/1954 | United Kingdom . |
| 1558069 | 12/1979 | United Kingdom . |

OTHER PUBLICATIONS

"Architectural Concrete" Product Brochure, Labrado Forms, Inc., Copyright 1985.

*Primary Examiner*—Karen Aftergut
*Attorney, Agent, or Firm*—Flehr Hohbach Test Albritton & Herbert LLP; William S. Galliani

[57] ABSTRACT

A method of forming a patterned wall includes the step of aligning a linear edge of a first linear base form liner with a linear edge of a second linear base form liner to form a non-contoured composite notch surface between a first contoured surface of the first linear base form liner and a second contoured surface of the second linear base form liner. A coupling form liner is then positioned on the non-contoured composite notch surface to produce a continuous pattern between the first contoured surface and the second contoured surface. A mold is then constructed using the first linear base form liner, the second linear base form liner, and the coupling form liner. A hardenable material is then poured into the mold. The mold is removed when the hardenable material has dried to expose a patterned wall.

14 Claims, 5 Drawing Sheets

U.S. PATENT DOCUMENTS

| | | | |
|---|---|---|---|
| 2,629,135 | 2/1953 | Johnson | 18/60 |
| 2,689,381 | 9/1954 | Terriere | 18/60 |
| 3,002,322 | 10/1961 | Dorsett | 50/132 |
| 3,177,279 | 4/1965 | Bilodeau | 264/255 |
| 3,307,822 | 3/1967 | Stout | 249/189 |
| 3,344,570 | 10/1967 | Marson | 52/315 |
| 3,515,779 | 6/1970 | Jones | 264/41 |
| 3,524,790 | 8/1970 | Mason | 161/37 |
| 3,566,572 | 3/1971 | Wilkinson | 52/745 |
| 3,584,088 | 6/1971 | Williams | 264/31 |
| 3,584,826 | 6/1971 | Liester | 249/35 |
| 3,689,626 | 9/1972 | Scott | 264/253 |
| 3,692,458 | 9/1972 | Kirsch | 425/469 |
| 3,702,180 | 11/1972 | Jones | 249/188 |
| 3,795,721 | 3/1974 | Gilbert et al. | 264/42 |
| 3,817,289 | 6/1974 | Coffman | 138/155 |
| 3,820,936 | 6/1974 | Kirsch | 425/469 |
| 3,950,477 | 4/1976 | Di Giacomo | 264/226 |
| 3,954,377 | 5/1976 | Scholz et al. | 425/432 |
| 3,968,610 | 7/1976 | Medow | 52/314 |
| 4,116,415 | 9/1978 | Ward | 249/35 |
| 4,131,406 | 12/1978 | Fresquez | 425/385 |
| 4,135,840 | 1/1979 | Puccini et al. | 404/93 |
| 4,150,808 | 4/1979 | Sawyer | 249/111 |
| 4,159,097 | 6/1979 | Strickland | 249/40 |
| 4,239,820 | 12/1980 | Salvador | 427/272 |
| 4,267,221 | 5/1981 | Ishikawa | 428/121 |
| 4,275,540 | 6/1981 | Keller | 52/314 |
| 4,290,248 | 9/1981 | Kemerer et al. | 52/309.16 |
| 4,407,480 | 10/1983 | Trimmer et al. | 249/189 |
| 4,419,133 | 12/1983 | Shubow et al. | 106/85 |
| 4,555,088 | 11/1985 | Chang | 249/192 |
| 4,559,881 | 12/1985 | Lankard et al. | 109/83 |
| 4,627,764 | 12/1986 | Scheiwiller | 404/41 |
| 4,665,673 | 5/1987 | Diana | 52/314 |
| 4,769,191 | 9/1988 | Diana | 264/25 |
| 4,784,821 | 11/1988 | Leopold | 264/510 |
| 4,811,537 | 3/1989 | D'Epenoux | 52/385 |
| 4,840,004 | 6/1989 | Ting | 52/235 |
| 4,944,124 | 7/1990 | Armstrong | 52/169.12 |
| 4,977,731 | 12/1990 | Grainger | 52/747 |
| 5,221,505 | 6/1993 | McClure | 264/220 |
| 5,225,134 | 7/1993 | Nasvik et al. | 264/219 |
| 5,232,646 | 8/1993 | Nasvik et al. | 264/219 |

METHOD OF FORMING PATTERNED WALLS

This is a continuation of application Ser. No. 08/580,034 filed Dec. 20, 1995, now abandoned.

BRIEF DESCRIPTION OF THE INVENTION

This invention relates generally to form liners that are used to construct patterned walls of a hardenable material, such as concrete. More particularly, this invention relates to the use of linearly aligned form liners and interlocking form liners positioned therebetween to form randomly patterned walls.

BACKGROUND OF THE INVENTION

Form liners are used in the construction of patterned walls, for instance, sound barrier walls erected along a freeway. A form liner is a contoured surface that is vertically positioned in relation to another set of surfaces to form a mold. A hardenable material, such as concrete, is then poured into the mold and allowed to harden. As a result, the contoured surface on the form liner produces a corresponding contoured surface on the hardenable material.

The contoured surface is used to create an aesthetically pleasing wall. Stone patterns are commonly used for this purpose. An important aspect to an aesthetically pleasing wall is a randomly patterned contoured surface. In other words, it is important that the pattern established between form liners does not appear redundant. Another important aesthetic consideration is to avoid visually obtrusive seams between form liners.

U.S. Pat. No. 5,232,646 (the '646 patent) describes a method of forming walls wherein interlocking form liners are used. The '646 patent is expressly incorporated by reference herein. In the '646 patent, each form liner has at least two non-linear mating surfaces. The non-linear mating surfaces are used to create the appearance of a random pattern. The problem with the technology of the '646 patent is that the non-linear mating surfaces can be difficult to align. In addition, the non-linear mating surfaces repeatedly interconnect in the same manner. Thus, the resultant pattern can become redundant.

U.S. Pat. No. 5,225,134 (the '134 patent) discloses another method to form contoured walls. The '134 patent is expressly incorporated by reference herein. The '134 patent generates a wall with a random pattern by using aligned interlocking form liners that create a continuous stone pattern between form liners. In other words, a portion of a stone is formed at each form liner border so that when two form liners are placed next to one another, a single stone pattern is formed. The problem with the approach of the '134 patent is that extremely precise alignment is required between adjacent form liners. In addition, the resultant stone pattern has a seam in it where the form liners met.

In view of the foregoing, it would be highly desirable to develop a new methodology of forming patterned walls that does not have the problems associated with prior art techniques.

SUMMARY OF THE INVENTION

A method of forming a patterned wall includes the step of aligning a linear edge of a first linear base form liner with a linear edge of a second linear base form liner to form a non-contoured composite notch surface between a first contoured surface of the first linear base form liner and a second contoured surface of the second linear base form liner. A coupling form liner is then positioned on the non-contoured composite notch surface to produce a continuous pattern between the first contoured surface and the second contoured surface. A mold is then constructed using the first linear base form liner, the second linear base form liner, and the coupling form liner. A hardenable material is then poured into the mold. The mold is removed when the hardenable material has dried to expose a patterned wall.

The method is advantageous because it is very easy to align the linear edges of the first linear base form liner and the second linear base form liner. When contoured mortar surfaces are used at the linear edges, seams between form liners are less noticeable. A variety of interchangeable coupling form liners may be used at the non-contoured composite notch surface so that the pattern at the edges does not become redundant. Redundancy is further avoided by using different positional orientations for the various form liners.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
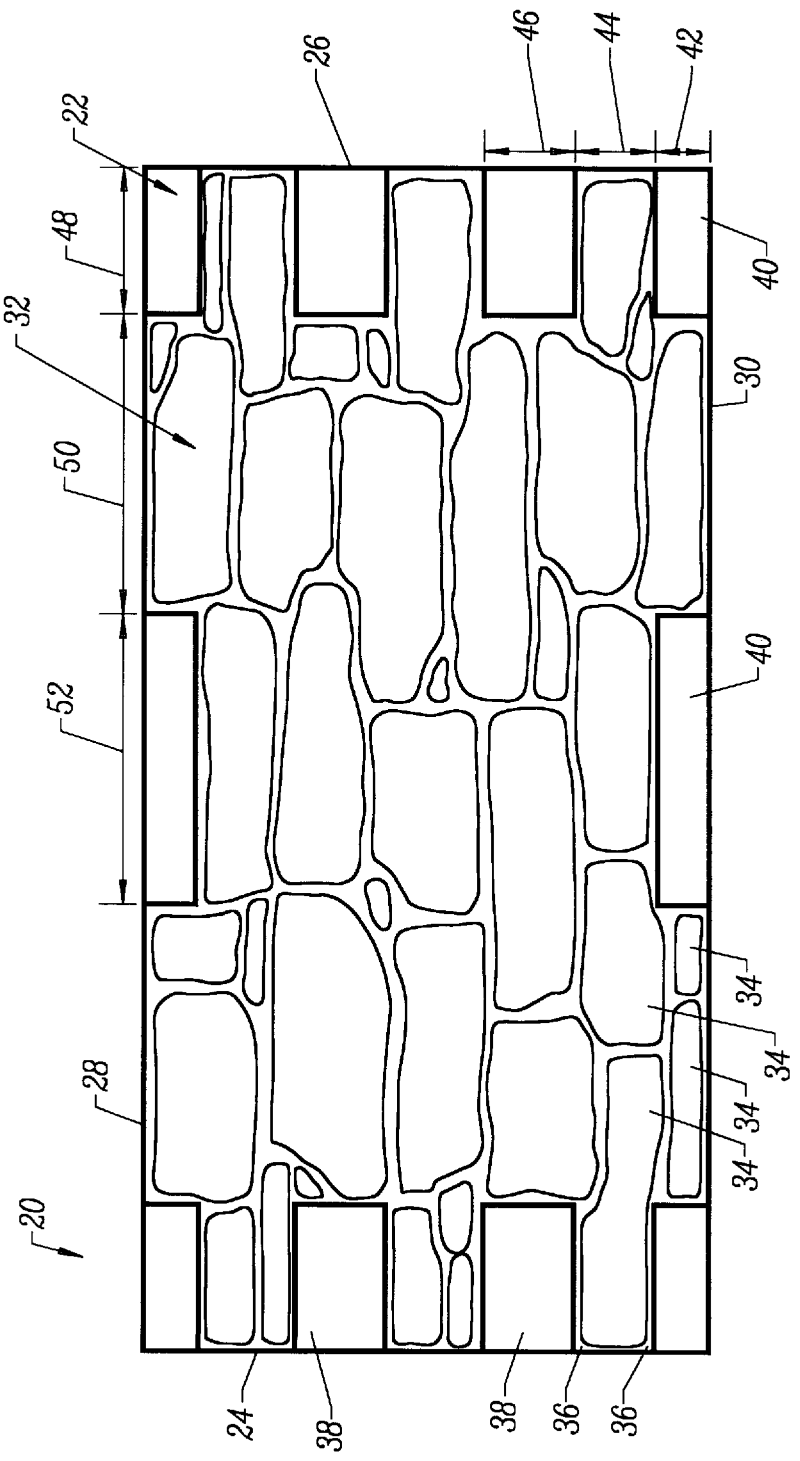
FIG. 1 illustrates a linear base form liner in accordance with one embodiment of the invention.

FIG. 1 illustrates a linear base form liner 20 that is used with the method of the invention. The linear base form liner 20 includes a linear substrate 22 with first vertical axis linear edge 24, a second vertical axis linear edge 26, a first horizontal axis linear edge 28, and a second horizontal axis linear edge 30.

Attached to the linear base substrate 22 (or formed integral therewith) is a contoured surface 32. The contoured surface 32, by way of example, may include contoured stone regions 34 surrounded by contoured mortar regions 36. The contoured surface 32 is not formed over the entire linear base substrate 22. Instead, the perimeter of the contoured surface defines non-contoured vertical notch surfaces 38 and non-contoured horizontal notch surfaces 40.

The linear base substrate 22 is typically in a rectangular or square configuration. The linear base substrate 22 may be formed of wood or any other suitable material. The contoured surface 32 may be formed of rubber or any other suitable material. The contoured surface 32 may be attached to the linear base substrate 22 with an adhesive or fasteners. In the alternative, the linear substrate 22 and the contoured surface may be integrally formed. One embodiment of the invention used the following dimensions. The length of the area marked by the arrow 42 was four inches, the length of the area marked by the arrow 44 was eight inches, the length of the area marked by the arrow 46 was eight inches, etc. for a total vertical length of forty-eight inches. On the horizontal axis, the length of the area marked by the arrow 48 was twelve inches, the length of the area marked by the arrow 50 was twenty-four inches, and the length of the area marked by the arrow 52 was twenty-four inches, etc. for a total horizontal length of ninety-six inches.

Figure 2:
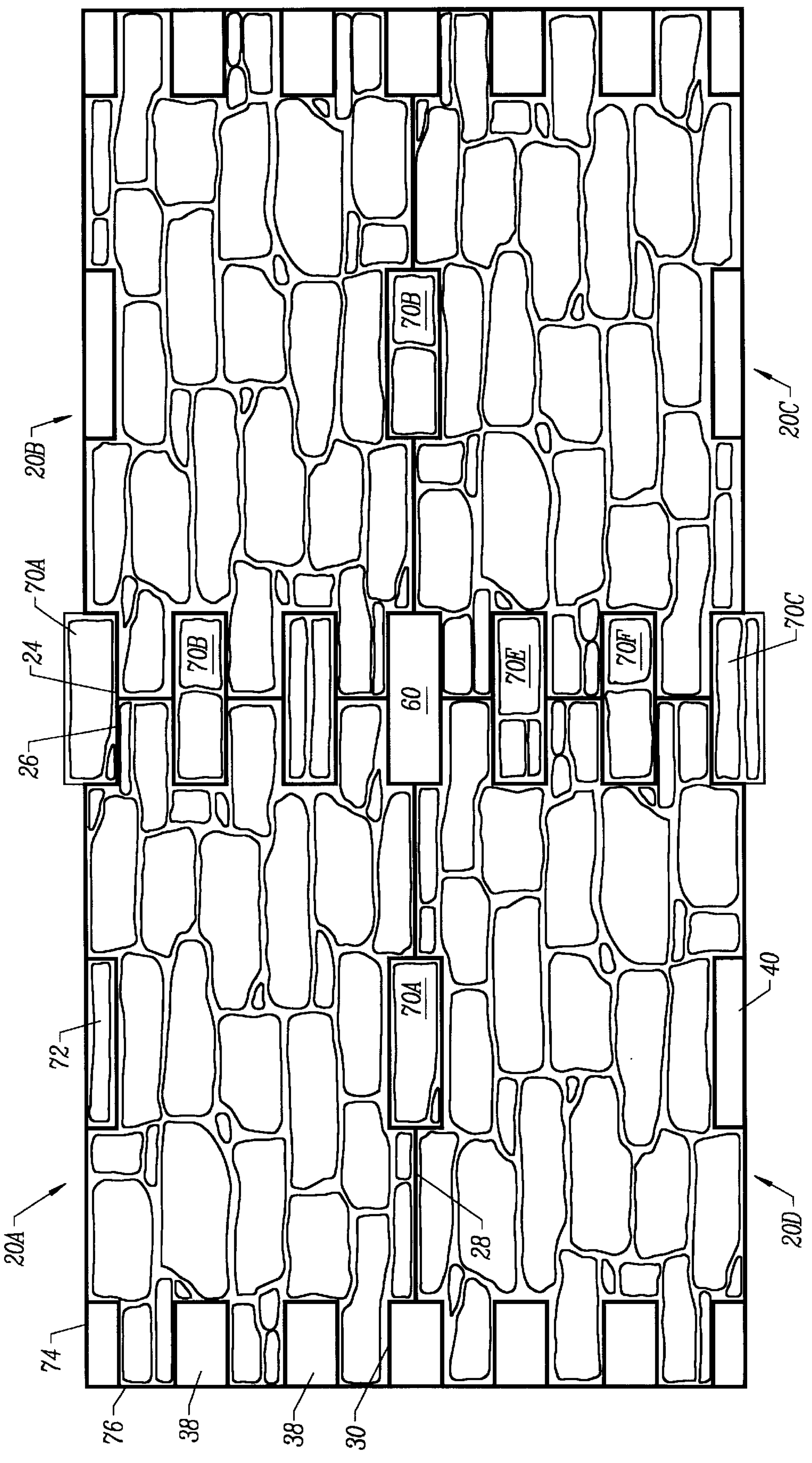
FIG. 2 illustrates a set of combined linear base form liners with coupling form liners positioned therebetween, in accordance with another embodiment of the invention.
Figure 3:
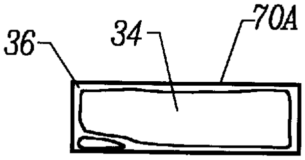
FIGS. 3–9 illustrate various coupling form liners that may be used in accordance with the invention.
Figure 4:
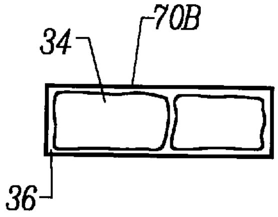
Figure 5:
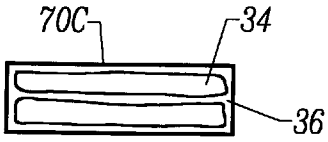
Figure 6:
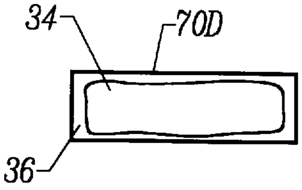
Figure 7:
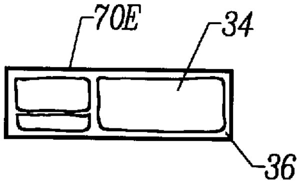
Figure 8:
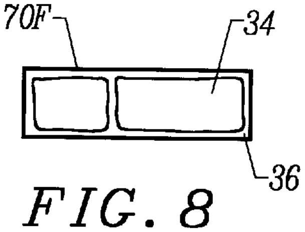

FIG. 2 illustrates a first linear base form liner 20A, aligned with a second linear base form liner 20B, aligned with a third linear base form liner 20C, which is aligned with a fourth linear base form liner 20D. As shown in FIG. 2, the vertical linear edges of adjacent form liners are aligned so that the non-contoured vertical notch surfaces meet. For example, the second vertical axis linear edge 26 of linear base form liner 20A meets with the first vertical axis linear edge 24 of linear base form liner 20B. This results in a non-contoured composite notch surface 60. Similarly, the horizontal linear edges of adjacent form liners are aligned so that the non-contoured horizontal notch surfaces meet. For example, the second horizontal axis linear edge 30 of linear base form liner 20A meets with the first horizontal axis linear edge 28 of linear base form liner 20D. This results in a non-contoured composite notch surface 60.

Figure 9:
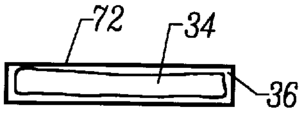

In accordance with the invention, after a set of linear base form liners 20A–20D are aligned, coupling form liners are positioned in the resultant non-contoured composite notch surfaces. FIGS. 3–8 illustrate examples of coupling form liners with distinct surface contours. Note that each coupling form liner of FIGS. 3–8 includes contoured stone regions surrounded by contoured mortar regions. FIG. 9 illustrates an example of an edge form liner 72 to fill an un-matched non-contoured horizontal notch surface 40.

Returning now to FIG. 2, it can be seen that the coupling form liners of FIGS. 3–8 have been inserted into the various non-contoured composite notch surfaces 60. Note that the composite notch surfaces have mortar perimeters. Further, note that the coupling form liners also have mortar perimeters. Since the respective mortar perimeters are in contact with one another, the resultant seam is less obtrusive. This stands in contrast to prior art approaches that yield a seam over a stone surface extending between form liners.

As can be appreciated with reference to FIG. 2, the use of a variety of coupling form liners 70A–70F reduces the predictability of the resultant pattern. Each coupling form liner may be rotated by 180 degrees to further reduce pattern predictability. The lack of pattern predictability is further enhanced by the fact that contoured stone regions of various coupling form liners 70A–70F extend between linear base form liner surfaces.

The method of the invention further reduces the tendency for redundant patterns by allowing each linear base form liner 20 to be positioned with a different orientation. For example, note that the linear base form liners 20A–20D have the same contour pattern. However, the orientation of the contour patterns is distinct. For instance, the pattern of form liner 20A is rotated by 180 degrees at the second position of form liner 20B.

FIG. 2 illustrates the edge form liner 72 used to create a linear surface at the top of form liner 20A. Similar edge form liners may be used to create linear vertical surfaces. In the alternative, the ends of a wall pattern to be formed may use linear base form liners with linear edges. For example, if form liner 20A were to be at the left-most end of a wall pattern, a substitute form liner may be used such that edge 74 does not have non-contoured horizontal notch surfaces 40 and edge 76 does not have non-contoured vertical notch surfaces 38.

Figure 10:
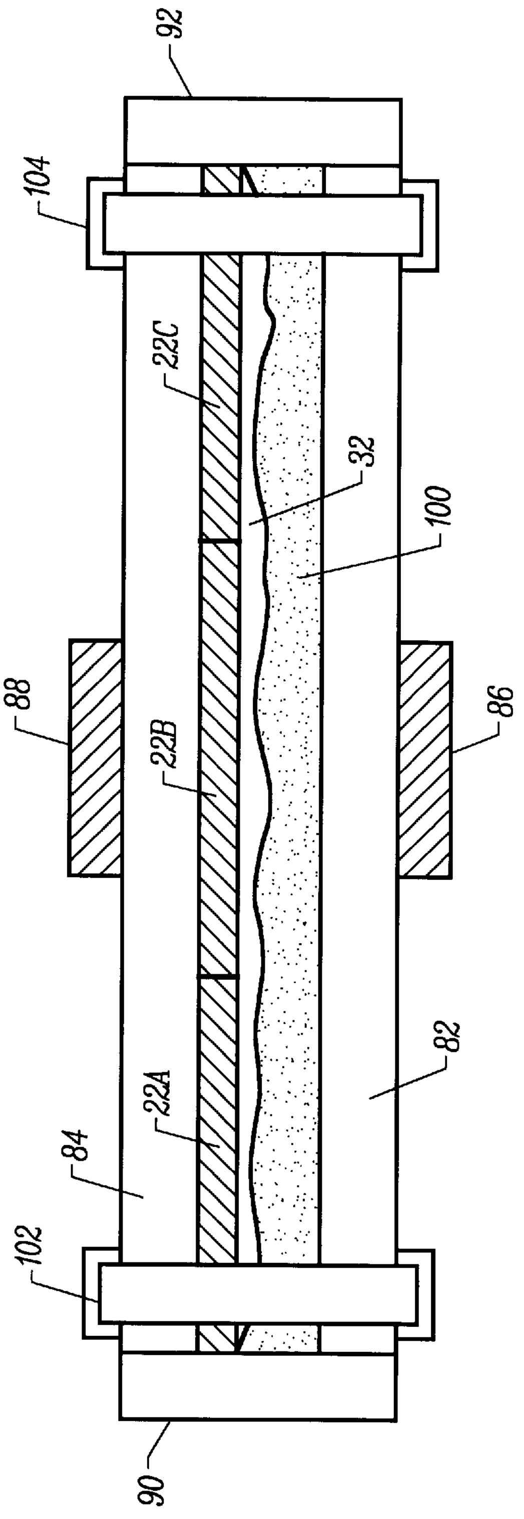
FIG. 10 illustrates a form liner mold incorporating form liners of the present invention.

Once a pattern of form liners 20 and coupling form liners 70A–70F is created, those elements may be used to form a mold, in accordance with prior art techniques. FIG. 10 illustrates an example of a suitable mold. FIG. 10 illustrates three linear substrates 22A, 22B, and 22C forming a continuous contoured surface 32. A back support 84 is positioned behind the linear substrates 22A, 22B, and 22C. The back support 84 is braced by a back vertical support 88. Similarly, a front support 82 is braced by a front vertical support 86. A first end piece 90 and a second end piece 92 are then used to enclose the mold so that a hardenable material 100 may be poured therein. Optionally, a first wall depth maintenance mechanism 102 and a second wall depth maintenance mechanism 104 may be used to fix the depth of the wall. These devices may be implemented with bolts running through the wall, with clamps attached to the top of the wall, or through other equivalent means.

Figure 11:
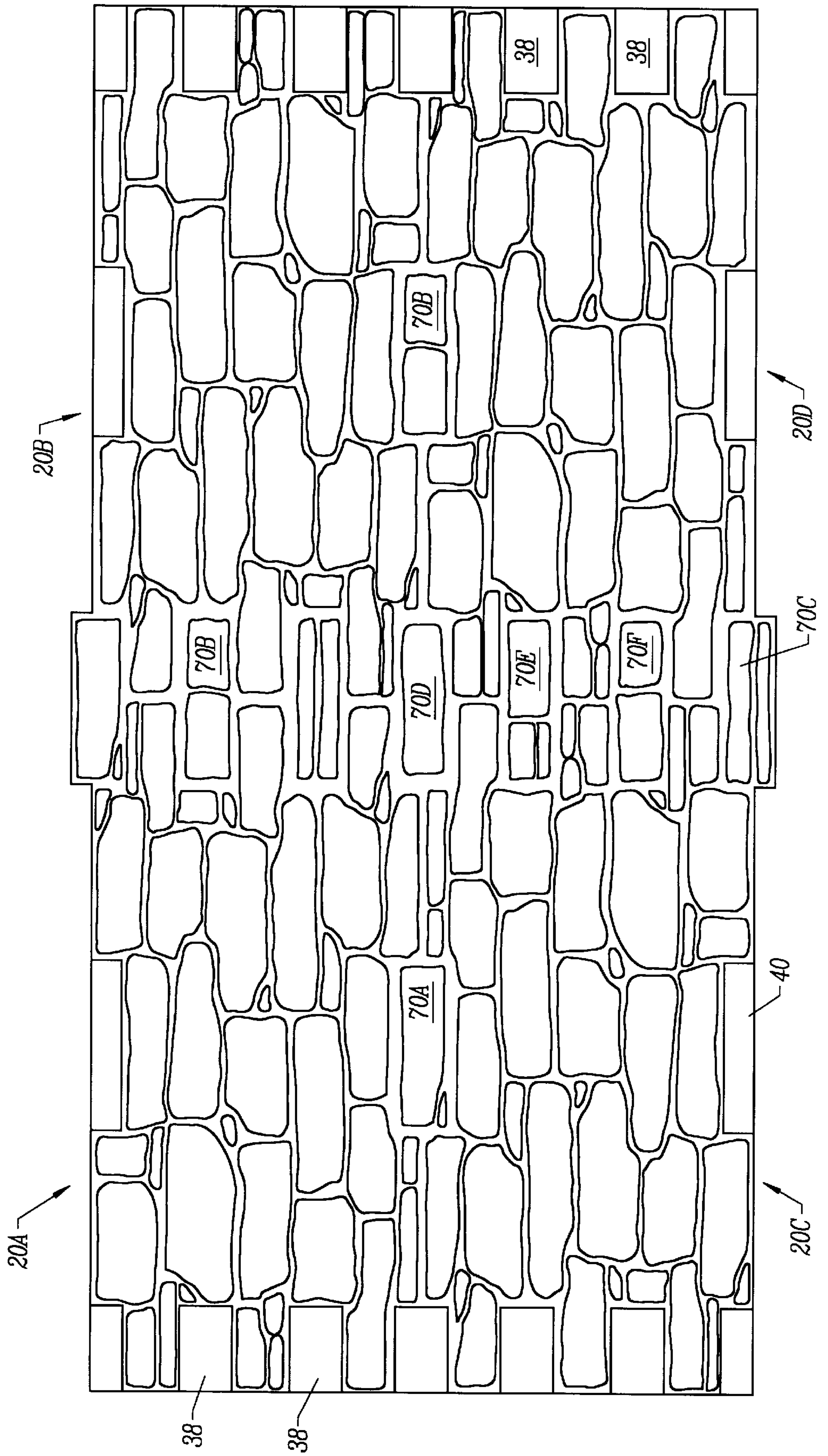
FIG. 11 illustrates a patterned wall formed in accordance with the present invention.

FIG. 11 illustrates a patterned wall formed in accordance with the method of the invention. The exaggerated border lines of the form liners 20A–20D of FIG. 2 are no longer present. FIG. 11 is for the purposes of illustration, naturally a finished wall would substitute the coupling form liners 70A and 70C at the top and bottom surfaces of the wall with edge form liners 72. In addition, edge form liners 72 would be used in the remaining non-contoured vertical notch surfaces 38 and non-contoured horizontal notch surfaces 40.

The favorable attributes of the invention discussed in reference to FIG. 2 are particularly observable in FIG. 11. Specifically, the matching mortar perimeters of the linear base form liners 20 and the coupling form liners 70A–70F avoid noticeable seams. In addition, the use of a variety of coupling form liners 70A–70F, each of which can be used with different positional orientations, reduces the predictability of a pattern. Pattern predictability is also avoided by having contoured stone regions of the coupling form liners extend between linear base form liners. Predictable patterns are further avoided by changing the orientation of the various linear base form liners 20.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A method of forming a patterned wall, said method comprising the steps of:

aligning a linear edge of a first linear base form liner with a linear edge of a second linear base form liner to form a non-contoured composite notch surface between a first contoured surface of said first linear base form liner and a second contoured surface of said second linear base form liner;

positioning a coupling form liner on said non-contoured composite notch surface to produce a continuous pattern between said first contoured surface and said second contoured surface;

forming a mold incorporating said first linear base form liner aligned with said second linear base form liner, and having said coupling form liner positioned between said aligned first and second linear base form liners;

pouring a hardenable material into said mold;

drying said hardenable material; and removing said mold from said dried hardenable material to expose said patterned wall.

2. The method of claim 1 wherein said aligning step produces a plurality of non-contoured composite notch surfaces between said first contoured surface of said first linear base form liner and said second contoured surface of said second linear base form liner.

3. The method of claim 2 further comprising the step of positioning a plurality of coupling form liners in said plurality of non-contoured composite notch surfaces.

4. The method of claim 3 wherein each coupling form liner of said plurality of coupling form liners has a distinct surface contour.

5. The method of claim 1 wherein said aligning step results in contoured mortar regions of said linear edge of said first linear base form liner being aligned with contoured mortar regions of said linear edge of said second linear base form liner.

6. The method of claim 5 wherein said positioning step includes the step of positioning a coupling form liner with a contoured stone region surrounded by a contoured mortar region, said contoured mortar region matching selected contoured mortar regions of said linear edge of said first linear base form liner and of said linear edge of said second linear base form liner.

7. A method of forming a patterned wall, said method comprising the steps of:

placing at a first location a first linear base form liner with a vertical linear edge with a plurality of non-contoured vertical notch surfaces;

fixing at a second location a second linear base form liner with a vertical linear edge with a plurality of non-contoured vertical notch surfaces and a first horizontal linear edge with a plurality of non-contoured horizontal notch surfaces, such that said plurality of non-contoured vertical notch surfaces of said second linear base form liner are aligned with said plurality of non-contoured vertical notch surfaces of said first form liner to establish a plurality of vertical non-contoured composite notch surfaces;

setting at a third location a third linear base form liner with a horizontal linear edge with a plurality of non-contoured horizontal notch surfaces, such that said plurality of non-contoured horizontal notch surfaces of said third linear base form liner are aligned with said plurality of non-contoured horizontal notch surfaces of said second form liner to establish a plurality of horizontal non-contoured composite notch surfaces;

positioning a plurality of coupling form liners in said plurality of vertical non-contoured composite notch surfaces and said plurality of horizontal non-contoured composite notch surfaces;

forming a mold incorporating said placed first linear base form liner, said fixed second linear base form liner, said set third linear base form liner, and said positioned plurality of coupling form liners;

pouring a hardenable material into said mold;

drying said hardenable material; and removing said mold from said dried hardenable material to expose said patterned wall.

8. The method of claim 7 wherein said plurality of vertical non-contoured composite notch surfaces are surrounded by contoured mortar regions of said first linear base form liner and said second linear base form liner.

9. The method of claim 8 wherein said plurality of horizontal non-contoured composite notch surfaces are surrounded by contoured mortar regions of said second linear base form liner and said third linear base form liner.

10. The method of claim 9 wherein each coupling form liner of said plurality of coupling form liners has a contoured mortar border to match said contoured mortar regions of said first linear base form liner, said second linear base form liner, and said third linear base form liner.

11. The method of claim 10 wherein each coupling form liner of said plurality of coupling form liners has a contoured stone region extending between contoured surfaces of at least two of said three linear base form liners.

12. The method of claim 7 wherein each coupling form liner of said plurality of coupling form liners has a distinct surface contour.

13. The method of claim 7 wherein said second linear base form liner has a second horizontal linear edge with a plurality of second edge non-contoured horizontal notch surfaces, said fixing step including the step of placing edge form liners on said second edge non-contoured horizontal notch surfaces.

14. The method of claim 7 wherein said first linear base form liner and said second linear base form liner have the same contour pattern, said fixing step including the step of fixing at said second location said second linear base form liner with a surface orientation that is distinct from a surface orientation of said first linear base form liner.

* * * * *